(12) United States Patent
Rankin

(10) Patent No.: US 6,670,803 B2
(45) Date of Patent: Dec. 30, 2003

(54) PART FEEDER VELOCITY MEASUREMENT SYSTEM

(75) Inventor: Brent Rankin, Lima, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/108,828

(22) Filed: Mar. 27, 2002

(65) Prior Publication Data

US 2003/0184283 A1 Oct. 2, 2003

(51) Int. Cl.[7] .............................. G01P 3/66; G01P 3/80
(52) U.S. Cl. ........................................ 324/178; 324/179
(58) Field of Search ............................... 324/178, 179, 324/180, 166, 207.18; 73/167; 222/56, 57, 64

(56) References Cited

U.S. PATENT DOCUMENTS

| 4,542,342 A | * | 9/1985 | Schmidt et al. ........ 324/207.18 |
| 4,688,432 A | | 8/1987 | Marsh |
| 5,191,283 A | | 3/1993 | Gesenhues |
| 5,637,996 A | * | 6/1997 | McDarren et al. .......... 324/178 |
| 6,016,055 A | | 1/2000 | Jager et al. |

* cited by examiner

Primary Examiner—N. Le
Assistant Examiner—Subhash Zaveri
(74) Attorney, Agent, or Firm—Rankin, Hill, Porter & Clark LLP; Alan T. McDonald; Vincent Ciamacco

(57) ABSTRACT

An apparatus for determining a velocity of a part through a part feeder tube. The part feeder tube defines an axis. The apparatus includes first and second sensors spaced axially from each other by a predetermined distance (d). The first sensor sends a first signal in response to sensing the part and the second sensor sends a second, subsequent signal in response to sensing the part. The velocity of the part is based on the distance (d) and the first and second signals.

15 Claims, 7 Drawing Sheets

PART FEEDER VELOCITY MEASUREMENT SYSTEM

BACKGROUND OF THE INVENTION

1. Field of the Invention

The present invention relates to a system and method for measuring the velocity of a part that is moving through a part feeder.

2. Description of Related Art

During an assembly of an apparatus, such as an automobile engine or transmission, many of the fasteners used in the assembly are installed, tightened, and torqued by automated assembly equipment. The assembly equipment is integrated into the assembly line and receives the fasteners from a part feeder system that can sort, orient and deliver the fasteners to the assembly equipment. In the part feeder system, the fasteners are oriented and placed in a plastic tube through which the part can move from a storage magazine through the part feeder to the automatic assembly equipment.

The part feeder system is a pneumatic delivery system. Air is supplied to the magazine end of the plastic tube to propel the fastener through the plastic tube to the assembly equipment. If the velocity of the fastener is too great, the fastener will be moving too quickly when it arrives at the assembly equipment. If the fastener arrives while moving too quickly the part may misalign in the assembly equipment. In addition, if the fastener is moving too quickly, it can be damaged. In contrast, if the fastener moves too slowly through the plastic tube, the fastener can jam or stall in the plastic tube. In addition, if the fastener is moving too slowly, it may not align properly should it reach the assembly equipment.

The velocity at which the fastener moves through the plastic tube is determined in part by such factors as the volume and pressure of the air supplied to the tube. The volume and pressure of the air supplied to the tube is adjustable by a manually adjustable regulator. During manual adjustments, best judgments and guesses are used to adjust the volume and pressure to optimize the fastener's velocity through the delivery tube. The adjustments will be made by different people during different shifts. Because the fastener's velocity is controlled indirectly using the regulator, there is no direct measure of the fastener velocity. The potential for improper adjustment or improper fastener velocity can be higher using indirect measurement compared to direct measurement.

SUMMARY OF THE INVENTION

The present invention provides an apparatus for determining a velocity of a part through a part feeder tube. The part feeder tube defines an axis. The apparatus includes first and second sensors spaced axially from each other by a predetermined distance (d). The first sensor sends a first signal in response to sensing the part and the second sensor sends a second, subsequent signal in response to sensing the part. The velocity of the part is based on the distance (d) and the first and second signals.

The present invention also provides a method of determining the velocity of a part through a part feeder tube. The method includes the step of sensing initially when the part is within a predetermined first location and sensing subsequently when the part is within a predetermined second location. The second location is spaced a known, predetermined distance from the first location. The method includes the step of determining the elapsed time between the initial sensing and the subsequent sensing, and determining the velocity of the part using the elapsed time and the distance.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
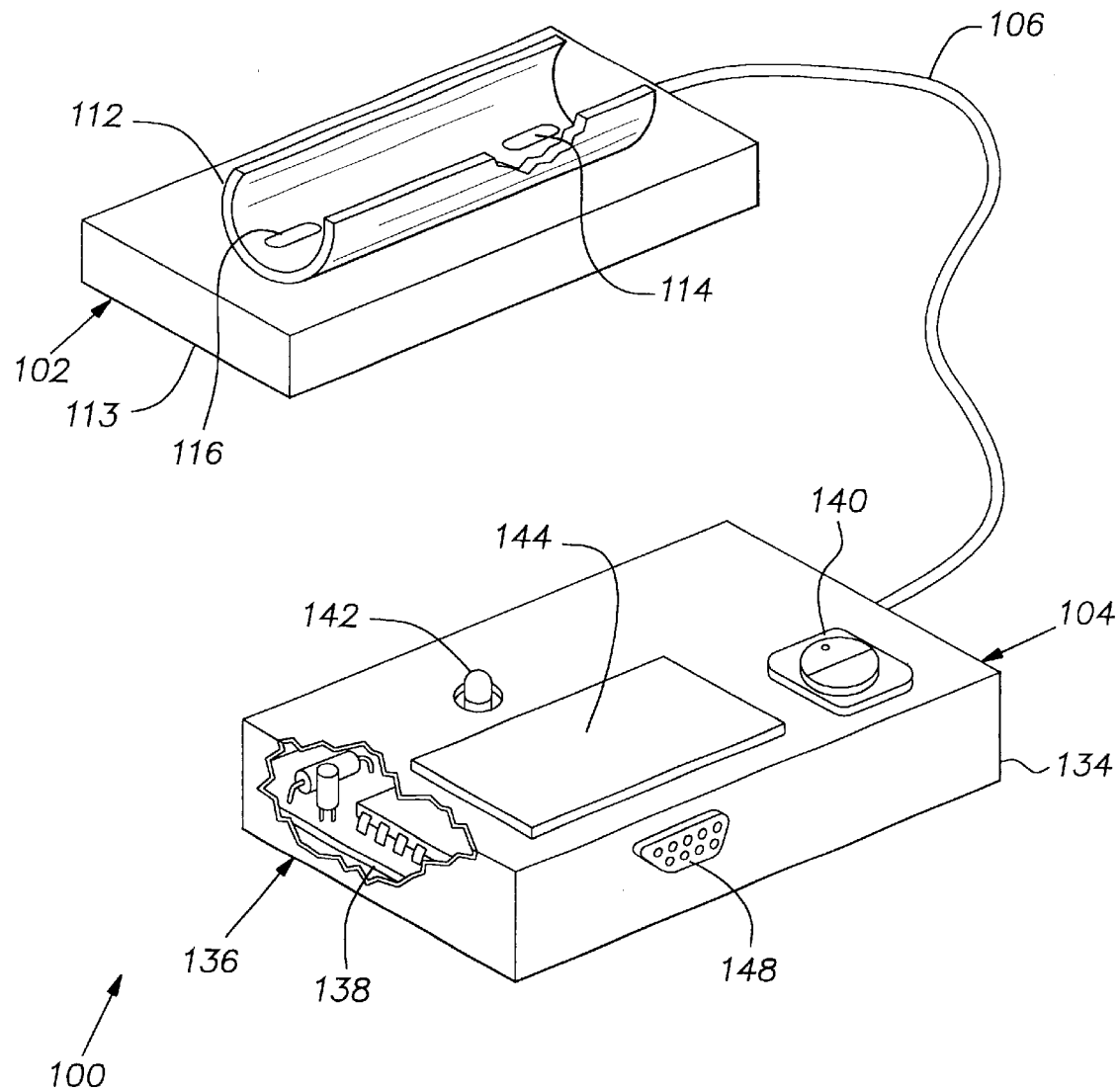
FIG. 1 is a perspective view of an apparatus comprising a first embodiment of the invention.

A part velocity measuring system (PVMS) 100 comprising a first embodiment of the invention is shown in FIG. 1. The PVMS 100 is a system that measures the velocity of a part moving through a part distribution system and sends the velocity measurement to, for example, a display screen and a data output port.

With reference to FIG. 1, the PVMS 100 includes a detection unit 102 and a receiver unit 104 communicating with the detection unit 102 through a cable 106. The detection unit 102 includes a sensor head 112 mounted on a sensor head housing 113. Included in the sensor head 112 are first and second sensors 114, 116. The sensors 114, 116 are spaced from each other on the sensor head 112 a known predetermined distance.

The receiver unit 104 includes a receiver housing 134 and a computer 136. The computer 136 includes a circuit board 138 that is disposed inside of the receiver housing 134. The receiver unit 104 also includes an LED unit 142, an alpha-numeric display unit 144, and a data output port 148. A power switch 140 on the receiver unit 104 turns the PVMS 100 on and off.

Figure 2:
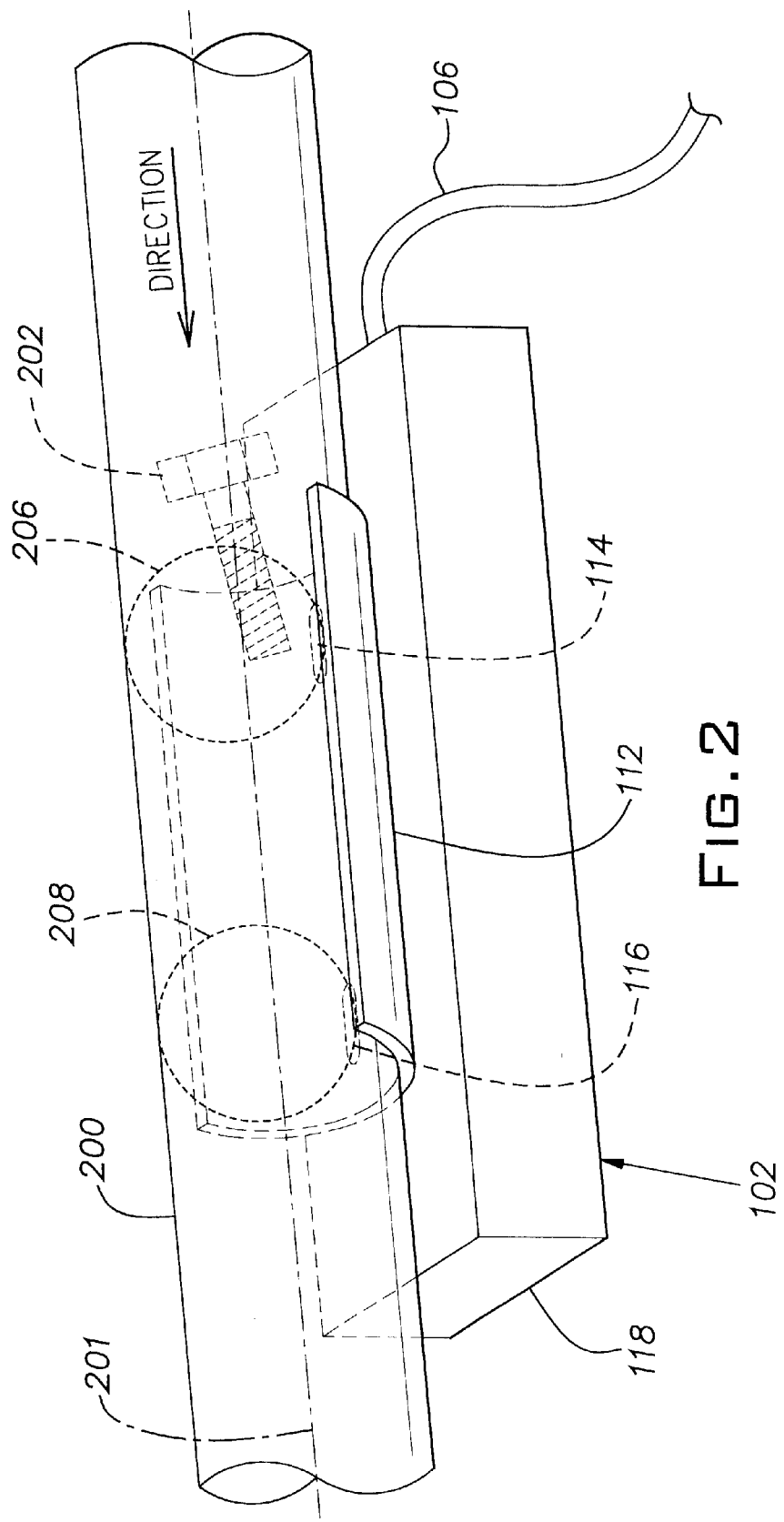
FIG. 2 is a perspective view of part of the apparatus shown in FIG. 1 in an operational orientation with a part feeder tube.

With reference to FIG. 2, the detection unit 102 is shown in an operational position adjacent to a polyvinyl chloride (PVC) plastic part feeder tube 200. The part feeder tube 200 is a portion of a part distribution system. In this example, the part distribution system is an automatic assembly system for automobiles and automotive components.

The part feeder tube 200 defines an axis 201. The sensor head 112 engages the part feeder tube 200 so that the sensors 114, 116 are spaced radially from the axis 201 and axially from each other. A directional arrow labeled DIRECTION indicates the direction a part 202 moves through the part feeder tube 200. The part 202 is a ferro-metallic bolt for use as a fastener in an automobile engine.

In this embodiment, the sensors 114, 116 are magnetic sensors. The sensors 114, 116 create first and second detection zones 206, 208, respectively. Because the sensors 114, 116 are spaced apart from each other by a known distance, the detection zones 206, 208 are proportionally spaced apart from each other by a known distance. In this example, the distances between the sensors 114, 116 and the zones 206, 208 are the same. The detection zones 206, 208 are defined by magnetic fields. The magnetic fields extend from their respective sensor 114, 116 radially across the part feeder tube 200. Accordingly, the detection zones 206, 208 extend transverse to the axis 201.

Figure 3:
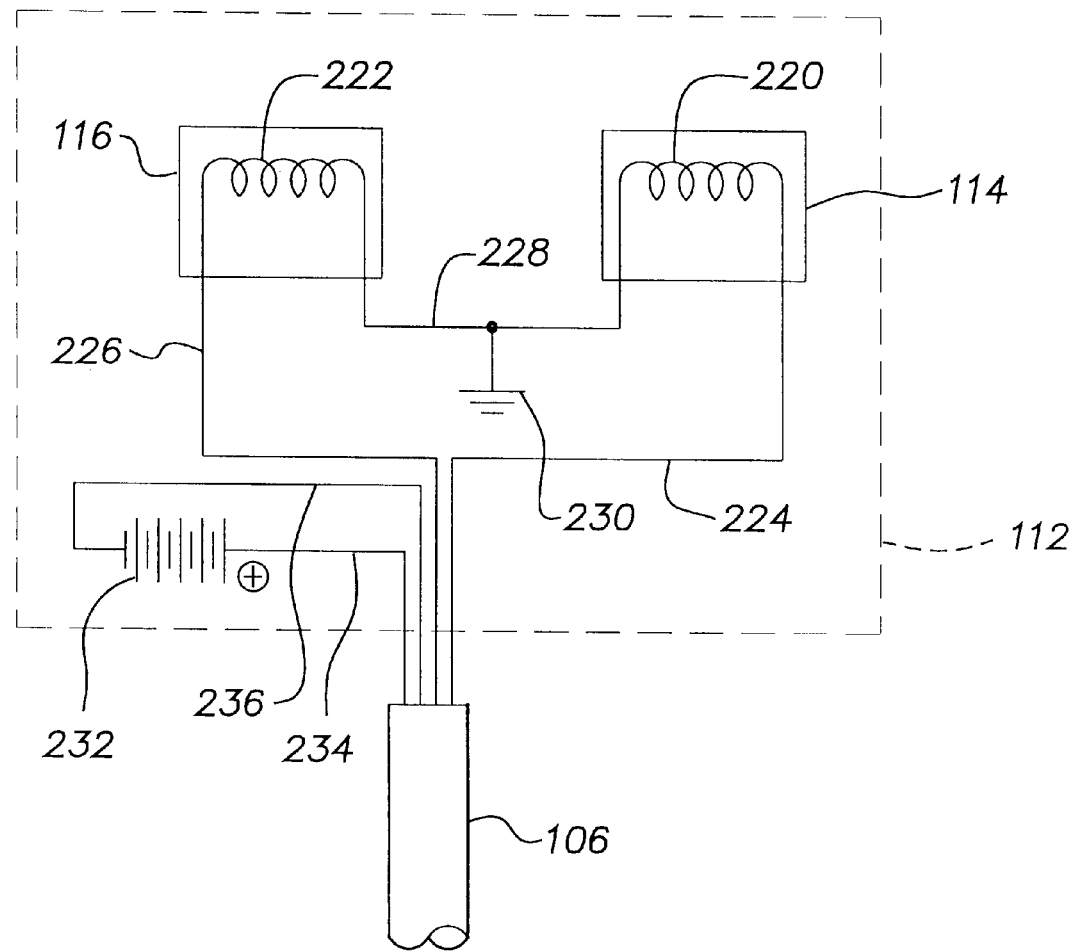
FIG. 3 is a diagram of part of the apparatus shown in FIG. 1.

With reference to FIG. 3, the sensor head 112 includes inductors 220, 222. The inductors 220, 222 communicate with the receiving unit 104 through circuits 224, 226, respectively. The cable 106 houses the circuits 224, 226 along a portion of the connection. A circuit 228 communicates the inductors 220, 222 with ground 230. The sensor head 112 also includes a battery 232. The battery 232 communicates through circuits 234, 236 with the receiving unit 104.

Figure 4:
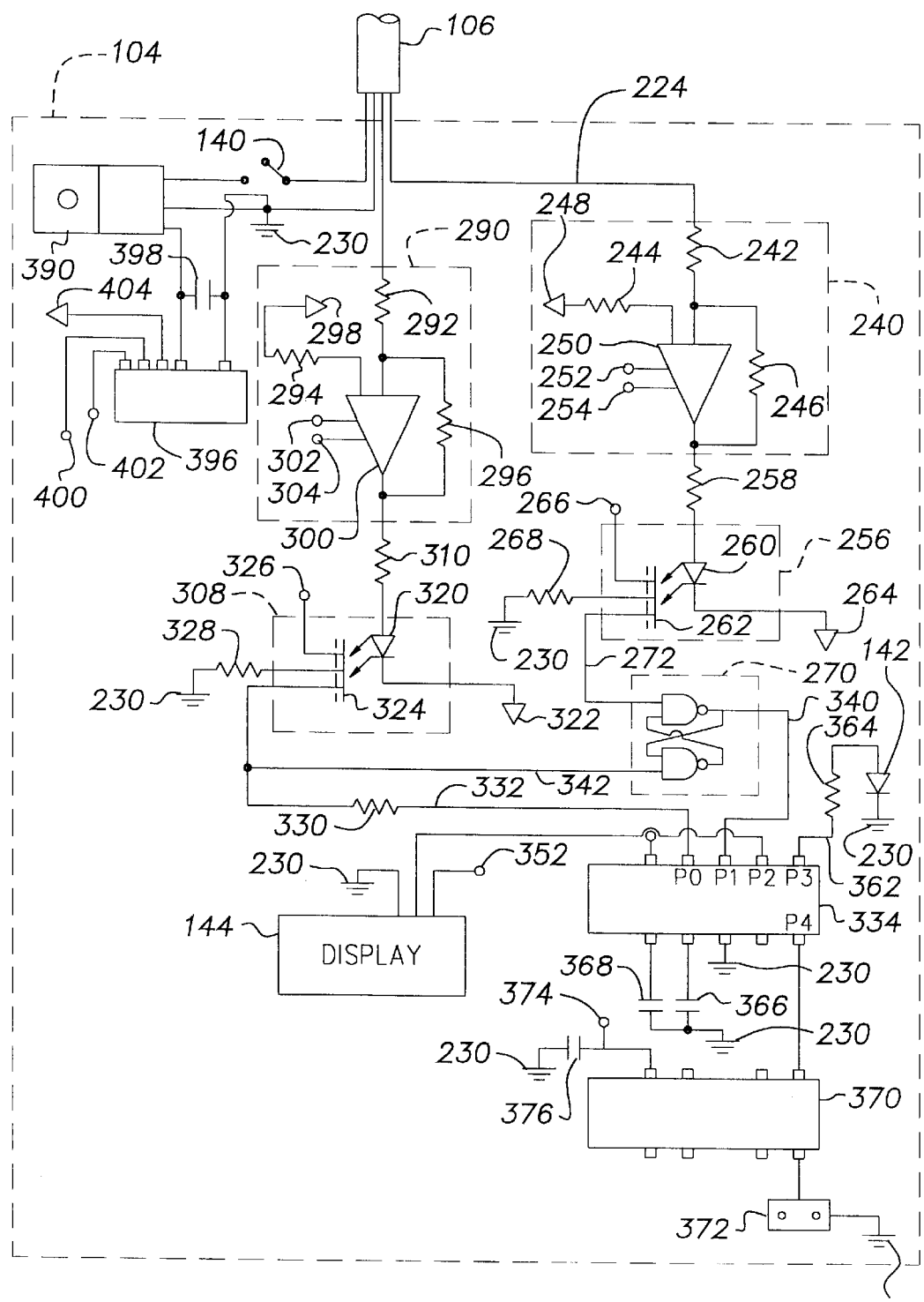
FIG. 4 is a diagram of part of the apparatus shown in FIG. 1.

With reference to FIG. 4, the receiver unit 104 includes a first amplifier circuit 240 that communicates with the sensor head 112 in the detection unit 102 through the circuit 224. The first amplifier circuit 240 includes resistors 242, 244 and 246. The resistor 244 communicates with a floating ground 248. A first operation amplifier 250 in the first amplifier circuit 240 communicates with power circuits 252, 254. The first operation amplifier 250 also communicates with a first optical isolator 256 through a current limiting resistor 258.

The first optical isolator 256 includes a diode 260. Both a detector 262 and a floating ground 264 communicate with the diode 260. Additionally, the detector 262 communicates with a power circuit 266 and a first pull-down resistor 268. The first pull-down resistor 268 communicates with ground 230. The detector 262 also communicates with a latch circuit 270 through a circuit 272.

The receiver unit 104 further includes a second amplifier circuit 290 that communicates with the sensor head 112 in the detection unit 102 through the circuit 226. The second amplifier circuit 290 includes resistors 292, 294 and 296. The resistor 294 communicates with another floating ground 298, which is like the floating ground 248. A second operation amplifier 300 in the second amplifier circuit 290 communicates with power circuits 302, 304 and with a second optical isolator 308 through a second current limiting resistor 310.

The second optical isolator 308 includes a second diode 320 that communicates with another floating ground 322 and a second detector 324. A power circuit 326, a second pull-down resistor 328 and the latch circuit 270 communicate with the second detector 324. The second resistor 328 communicates with ground 230. The second detector 324 also communicates through a resistor 330 and an output circuit 332 with an Input/Output (I/O) pin (P0) on a microprocessor 334.

As described above, the detector 262 communicates with the latch circuit 270 through a connection circuit 272. In turn, the latch circuit 270 communicates with two additional components. First, the latch circuit 270 communicates through a connection circuit 340 with an I/O pin (P1) of the microprocessor 334. Second, latch circuit 270 also communicates through a circuit 342 with the second optical isolator 308.

A plurality of input/output (I/O) pins allows the multifunctional microprocessor 334 to communicate. For example, the alphanumeric LCD display unit 144 communicates with the microprocessor 334 through an I/O pin (P2). The display unit 144 also communicates to ground 230 and to a 5 volt power circuit 352.

The microprocessor 334 communicates with the LED unit 142 through an I/O pin (P3), a resistor 364 and a circuit 362. The LED unit 142 further communicates to ground 230. Through other I/O pins, the microprocessor 334 communicates with a pair of capacitors 366, 368.

An RS232 driver 370 communicates with the microprocessor 334 through an I/O pin (P4). The RS232 driver communicates with an RS232 out plug 372 and further through to the data output port 148. The RS232 driver 370 also communicates with a 5 volt power circuit 374 and a capacitor 376 before ground 230. A controller (not shown) and other external devices can communicate through the data output port 148.

A power supply 390 communicates with the detection unit 102 through circuits 234, 236. The power switch 140 is located in the circuit 234 and can turn the power to the PVMS 100 on and off. An integrated circuit 396 and a capacitor 398 communicate with the power supply 390. The integrated circuit 396 communicates (+, −) 15 volts of power through the circuits 400, 402 to several other circuits 252, 254, 302 and 304 and with a floating ground 404.

Prior to startup, the sensors 114,116 are held in proper alignment with the part feeder tube 200 by the sensor head 102. The sensor head 102 is oriented relative to the part feeder tube 200 by the sensor head guide 110.

At the startup of the PVMS 100 and with reference to FIGS. 2–4, the PVMS 100 is activated by turning on the power switch 140. The sensors 114, 116 create the respective first and second detection zones 206, 208 and the microprocessor 334 resets the latch circuit 270. Specifically, the I/O pin (P0) turns on (+5 volts) and then off (0 volts) to reset the latch circuit 270.

Also, during startup, if the potential of the output circuit 332 is low (0 volts) and the potential of the second optical isolator 308 is high (+5 volt) the latch circuit 270 may be damaged. Accordingly, the potential of the second optical isolator 308 is kept low by the current limiting resistor 330 to decrease the likelihood of damage to the latch circuit 270.

During operation, the part 202 moves through the part feeder tube 200 to encounter the first detection zone 206. As the part 202 moves through the first detection zone 206, it causes a change in the lines of magnetic flux of the magnetic field in the first detection zone 206. This flux generates a current flow (i.e., an electrical pulse) in the inductor 220 in the first sensor 114. The current flow is an initial detection signal that flows from the sensor 114 and through the cable 106 to the receiving unit 104. Thus, the first sensor 114 senses the part 202 as it moves through the first detection zone 206 and responds by signaling the receiving unit 104.

In the receiving unit 104, the current (i.e., the signal) flows to the amplifier circuit 240 where it is amplified. Once amplified, the current flows through the current limiting resistor 258 to the optical isolator 256.

Prior to the amplified current flowing from the amplifier circuit 240, the output of the optical isolator 256 is held close to a ground potential (or logic low potential) by the resistor 268. This is OFF for the optical isolator 256. When the optical isolator 256 is switched to ON by the amplified current from the amplifier circuit 240, the optical isolator 256 converts the higher voltage output of the amplifier circuit to a +5 volt level used by the logic circuits. Thus, a +5 volt output (a logic high potential) is applied to the latch circuit 270 in response to the part moving through the detection zone 206.

When a logic high potential is applied to the latch circuit 270 by the optical isolator 256, the output circuit 340 of the latch circuit 270 is set to a logic high potential. The output circuit 340 communicates the logic high potential to the I/O pin (P1) of the microprocessor 334.

The microprocessor 334 measures the length of time that the I/O pin (P1) is in the logic high potential state.

As the part 202 continues to move through the part feeder tube 200 it subsequently enters the second detection zone 208. The second sensor 116 senses the part 202 entering the second detection zone 208 in a similar manner as the first sensor 114. The second sensor 116 responds to sensing the part 202 by signaling the receiving unit 104 with a subsequent detection signal. Specifically, the part 202 moves through the detection zone 222 of the second sensor 116 and changes the lines of magnetic flux passing through the inductor 222 of the second sensor 116. This causes an electrical current to flow in the inductor 222.

The current flows from the inductor 222 to the resistor 292 and further through to second amplifier circuit 290 where the current is amplified. The amplified current passes through the current limiting resistor 310 to the second optical isolator 308. Prior to receiving the amplified current from the second amplifier circuit 290, the second optical isolator 308 potential is held at ground potential by the second pull-down resistor 328. The optical isolator 308 is OFF when it has a ground potential.

When the optical isolator 308 receives the amplified current, it switches to ON. When switched to ON, the optical isolator 308 converts the higher voltage amplified current of the amplifier circuit 290 to a +5 volt level suitable for use by logic circuits. Specifically, the optical isolator 308 applies a +5 volt output (a logic high potential) through the circuit 242 to the latch circuit 270. This application resets the latching output circuit 340 to a logic low potential (e.g., a ground potential) from a logic high potential. The change from a high to a low potential on the I/O pin (P1) is processed by the microprocessor 334 to determine an elapsed time measurement (T1).

The computer 136 also determines whether there is a corresponding subsequent detection signal for each initial detection signal. That is, whether both of the sensors 114, 116 sensed the part 202 and each generated its respective detection signal. If the computer 136 fails to receive a corresponding subsequent signal for each initial detection signal, the computer 136 indicates a misread and does not calculate a measured velocity.

If there is no misread, the computer 136 calculates the time interval between the initial and subsequent detection signals. The distance between the sensors 114, 116 is known by the computer so that the computer 136 can calculate the velocity of the part 202 using the calculated time interval and the distance between the sensors 114, 116.

If the calculated velocity of the part 202 falls within a predetermined range of acceptable velocities, the computer 136 causes the LED indicator 142 to indicate a GOOD READ. If the calculated velocity of the part 202 does not fall within the predetermined range of acceptable velocities the computer 136 does not cause the LED indicator 142 to indicate a GOOD READ.

If the computer 136 determines that the measured velocity of the part 202 is a GOOD READ, as described above, the computer 136 causes the display unit 144 to display the measured velocity in pre-selected units. The displayed velocity will remain on the display unit 144 until another GOOD READ is determined or the power switch 140 is switched OFF.

The computer 136 sends the velocity information both to the display unit 144 and to the data output port 148. The RS232 driver 370 converts the output of the microprocessor 334 to an RS232 level, as required to drive external devices such as printers or other electronic recording and controlling devices.

Once the measured velocity of the part 202 is known, the velocities of subsequent parts can be adjusted so that their velocities are within the predetermined range of acceptable velocities. A regulator (not shown) automatically adjusts the pneumatic pressure in the part feeder tube 200 in response to data output from the data output port 148. In an alternative embodiment, the pneumatic pressure is manually adjusted in response to the displayed velocity on the display unit 144.

Accordingly, the subsequent parts will not move through the part feeder tube 200 too quickly or too slowly. This increases the likelihood that the subsequent parts will arrive at their destination with proper alignment, will not stall or jam in the part feeder tube 200 and will not be damaged during movement.

Figure 5:
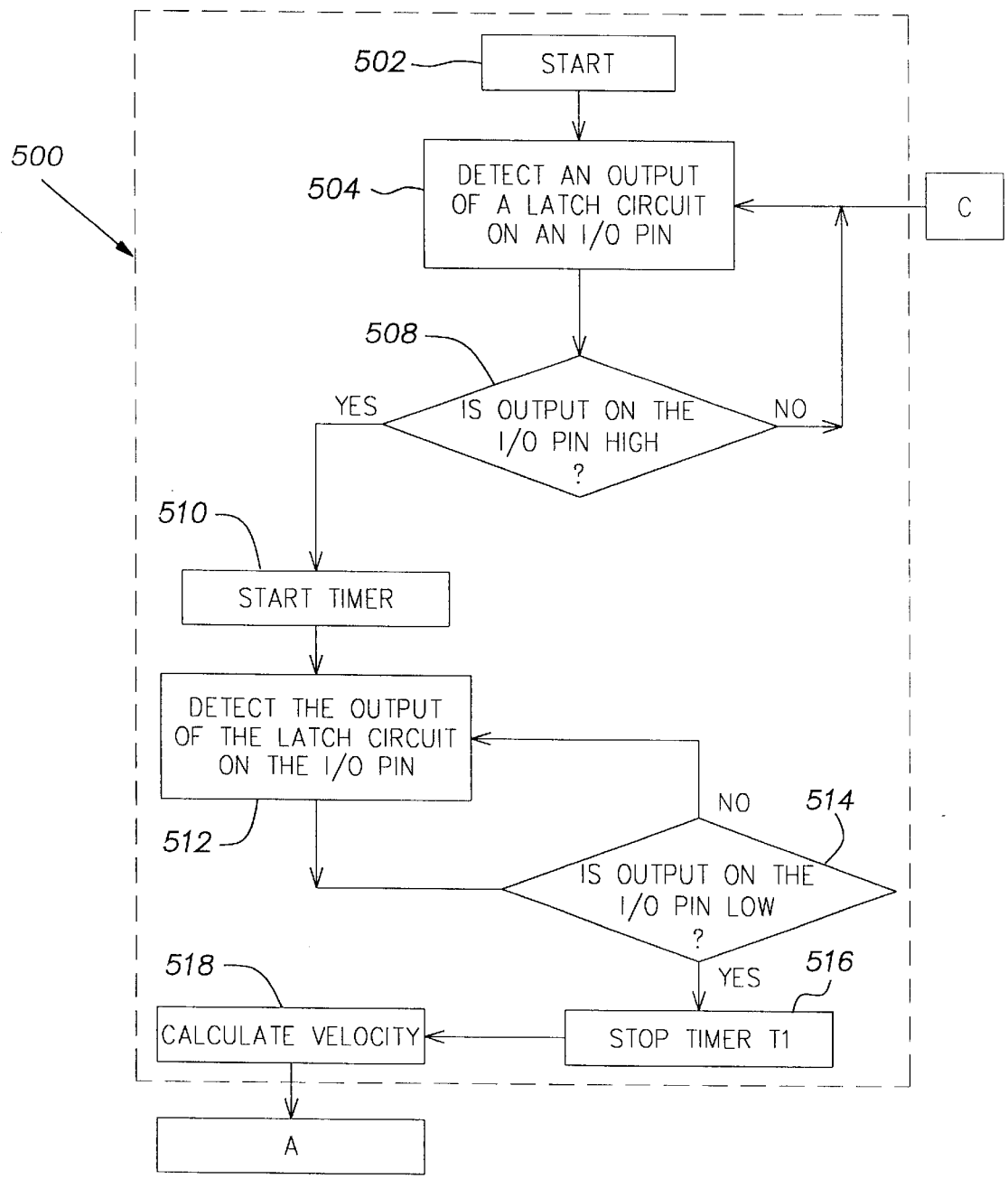
FIG. 5 is a flow chart of a second embodiment of the invention.
Figure 6:
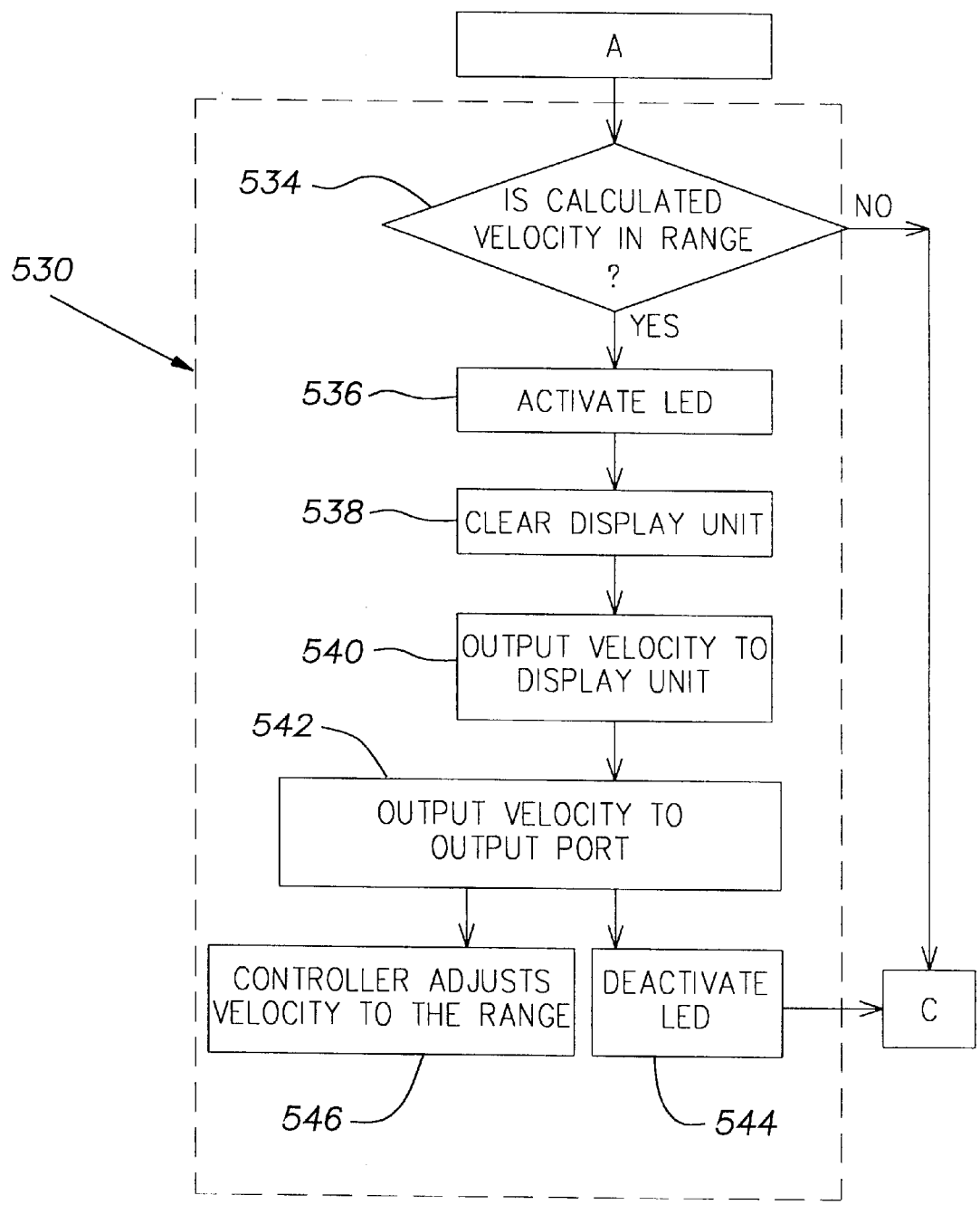
FIG. 6 is a flow chart of a third embodiment of the invention.

With reference to FIGS. 5 and 6, a block flow chart 500 of a method comprising a second embodiment of the present invention is shown. Generally, a programmed microprocessor measures the length of time that an I/O pin is in a high state (+5 volt level), calculates the part velocity based on the time and a known distance, indicates a read condition, displays a calculated velocity, and signals the calculated velocity to an external device. External devices can be, for example, printers and controllers.

Preferably, prior to the start of the subroutine 500, the internal resistors, timers, and input/output pins of a microprocessor are configured and calibrated. The subroutine indicated by the flow chart 500 starts at block 502 and continues with block 504. At block 504 the microprocessor detects the output potential of a latch circuit on an I/O pin.

With the detected output, the subroutine continues at decision block 508. If a low (ground) potential is detected on the I/O pin in block 504, a NO condition occurs and the subroutine moves back to block 508. If a high potential (for example, +5 volts) is detected on the I/O pin in block 504, then a YES condition occurs and the subroutine continues to block 510.

A timer starts at block 510 and counts in ten (10) microsecond increments. At block 512, which is similar to block 504, the output on the I/O pin is detected. The subroutine moves to decision block 514.

If the output is decided to be high at block 514, the subroutine moves back to block 512. If the output is decided to be low at block 514, the timer is turned off at block 516 and a time value (T1) for the time is determined. The time value (T1) is the elapsed period of time that the potential at the I/O pin was at a logic high potential. At block 518 the time value (T1) determined in block 516 is used, along with a known distance (d), to calculate a velocity (v). The calculated velocity (v) can then be used in a subsequent subroutine, if desired, indicated by the ending block A.

Reference numeral 530 generally indicates a flow chart of a subroutine subsequent to the above subroutine. This is indicated by the starting block A. At decision block 532, the previously calculated velocity (v) is compared to a predetermined range of velocities. Decision block 534 decides if the calculated velocity is within the predetermined range. If the calculated velocity is not within the predetermined range, a NO condition occurs and the subroutine moves to block 508, as indicated by block C. However, if the calculated velocity is within the predetermined range, a YES condition occurs and the subroutine continues to block 536.

At block 536, a positive potential (e.g., +5 volts) is applied to an LED indicator to indicate that a GOOD READ condition has occurred. The subroutine continues to block 538 in which a display unit is cleared of any previous information. Once the display is cleared, the new velocity (v) is sent to the display unit in block 540. At block 542, the calculated velocity (v) is also sent to an output port in a serial RS232 format. Block 546 indicates that the calculated velocity (v) sent from the output port to a controller. The controller controls the velocity of the part. When the controller receives the calculated velocity (v) the controller controls the velocity to be within the predetermined range of velocities.

The subroutine deactivates the LED at block 544. The subroutine moves back to block 504, indicated by the block C.

Figure 7:
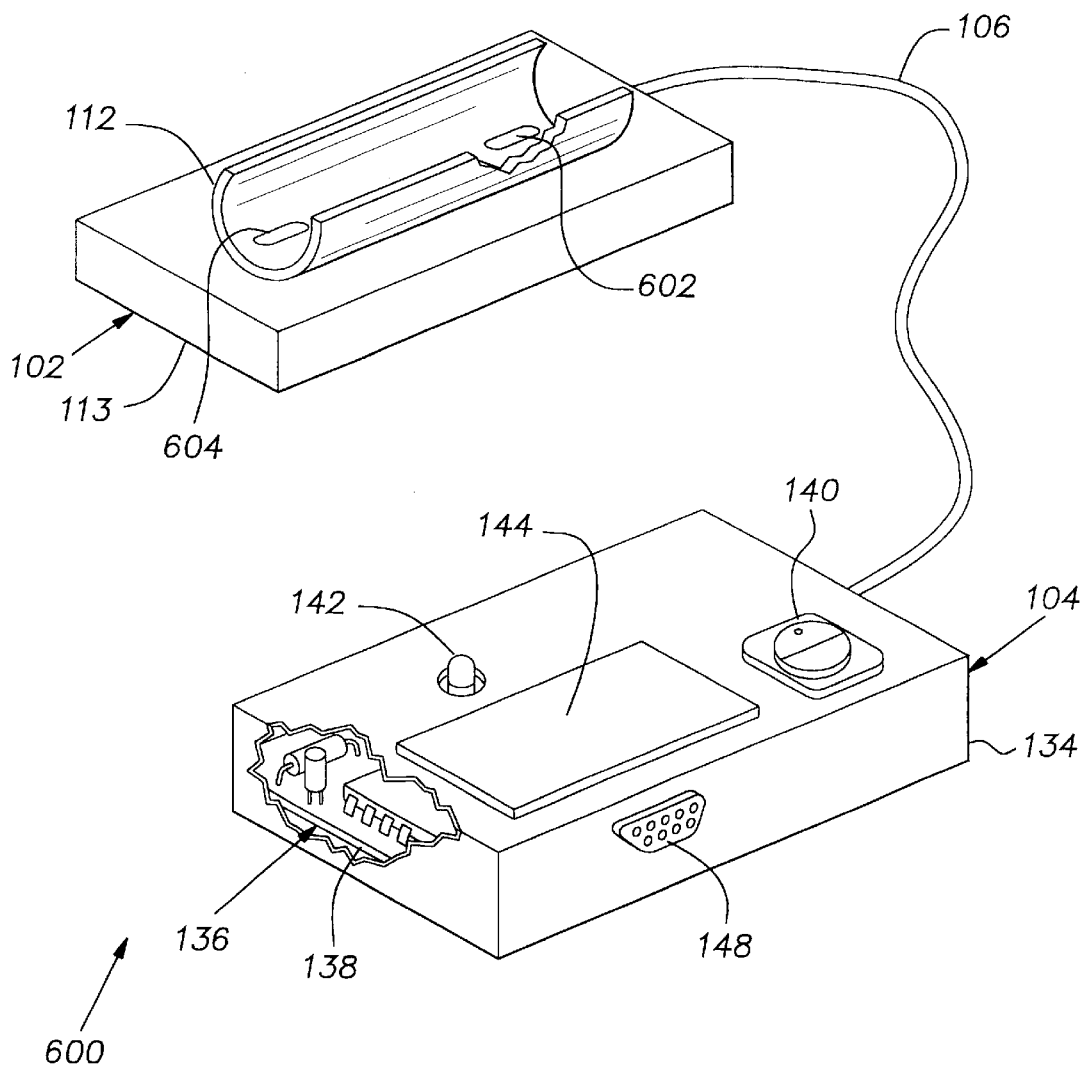
FIG. 7 is a schematic view of an apparatus comprising a fourth embodiment of the invention.

FIG. 7 shows a PVMS 600 comprising another embodiment of the present invention. The PVMS 600 includes many parts that are substantially the same as parts of the PVMS 100; this is indicated by the use of the same reference numerals in FIGS. 1 and 7. The PVMS 600 differs from the PVMS 100 in that the PVMS 600 includes optical sensors 602, 604. The optical sensors 602, 604 measure the velocity of a part in a part feeder tube (not shown). The part feeder tube is modified to allow the optical sensors 602, 604 access to the interior of the part feeder tube. The optical sensors 602, 604 are particularly useful for determining the velocity of non-magnetic parts.

The embodiments described herein are examples of structures, systems or methods having elements corresponding to the elements of the invention recited in the claims. This written description may enable those skilled in the art to make and use embodiments having alternative elements that likewise correspond to the elements of the invention recited in the claims. The intended scope of the invention thus includes other structures, systems or methods that do not differ from the literal language of the claims, and further includes other structures, systems or methods with insubstantial differences from the literal language of the claims.

What is claimed is:

1. An apparatus for controlling the velocity of parts through a part feeder tube, the part feeder tube defining an axis, said apparatus comprising:

first and second sensors spaced axially from each other by a predetermined distance (d), the first sensor is operable to send a first signal in response to sensing a part and the second sensor is operable to send a second, subsequent signal in response to sensing the part, a receiver unit connected to the first and second sensors to receive the first and second signals, said receiver unit being operable to calculate the velocity of the part based on the distance (d) and the first and second signals and to determine whether the calculated velocity is within a predetermined range of velocities, wherein if the calculated velocity is within the predetermined range, the receiver unit generates an output signal representative of the calculated velocity, and a controller operable to receive the output signal from the receiver unit and to adjust the velocity of a subsequent part in response thereto.

2. The apparatus as defined in claim 1, wherein the receiver unit comprises a circuit communicating with the first and second sensors that is operable to apply a high voltage in response to receiving the first signal, and that is further operable to stop applying the high voltage in response to receiving the second, subsequent signal.

3. The apparatus as defined in claim 2, wherein the receiver unit further comprises a microprocessor having an Input/Output pin communicating with the circuit, the microprocessor serving to measure a length of time (T1) that the high voltage is applied to the Input/Output pin and to determine the velocity of the part based on the length of time (T1) and the distance (d).

4. The apparatus as defined in claim 3, wherein the receiver unit further comprises a display unit and wherein the microprocessor is operable to display the velocity of the part on the display unit.

5. The apparatus as defined in claim 3, wherein the receiver unit further comprises an LED indicator, the microprocessor activating the LED indicator in response to determining that the velocity of the part is within the predetermined range.

6. The apparatus as defined in claim 1, wherein the first and second sensors are magnetic sensors.

7. The apparatus as defined in claim 1, wherein the first and second sensors are optical sensors.

8. The apparatus as defined in claim 1, further comprising a sensor head operable to orient the first and second sensors relative to the part feeder tube.

9. A method of determining a velocity of controlling the velocities of parts through a part feeder tube, comprising:

sensing initially when a part is at a predetermined first location;

sensing subsequently when the part is at a predetermined second location, the second location being spaced a predetermined distance from the first location;

determining an elapsed time between the initial sensing and the subsequent sensing;

determining the velocity of the part based upon the elapsed time and the predetermined distance; and using the velocity of the part to control the velocity of a subsequent part.

10. A method of determining a velocity of a part along a known distance (d) in a part feeder tube, comprising the steps of:

a) detecting an output of a circuit;

b) determining if the output is high;

c) returning to the step a) if the output is not high;

d) starting a timer if the output is high;

e) after the timer is started, detecting the output of the circuit;

f) determining if the output of the circuit is low;

g) returning to the step e) if the output is high;

h) stopping the timer if the output is low to determine an elapsed time (T1) between the step d) and the step h);

i) calculating the velocity of the part by dividing the distance (d) by the elapsed time (T1);

j) determining if the calculated velocity is within a predetermined range of velocities;

k) activating an LED if the calculated velocity is within the predetermined range of velocities;

l) outputting the calculated velocity to a display unit; and m) outputting the calculated velocity to a controller for controlling the velocity of a subsequent part.

11. A parts delivery apparatus for delivering parts from a storage area to a manufacturing process, said parts delivery apparatus comprising:

(a) a part feeder tube through which a part may travel, said part feeder tube having a central axis;

(b) a detection unit comprising a sensor head disposed against the feeder tube, said sensor head including first and second sensors spaced from each other along the axis of the part feeder tube by a predetermined distance (d), said first sensor being operable to send a first signal in response to sensing the part and said second sensor being operable to send a second, subsequent signal in response to sensing the part; and (c) a receiver unit connected to the first and second sensors to receive the first and second signals, said receiver unit being operable to calculate the velocity of the part based on the distance (d) and the first and second signals and to compare the calculated velocity to a predetermined range of velocities, wherein if the calculated velocity is within the predetermined range, the receiver unit generates an output signal for transmittal to an external device the external device is a controller that regulates a velocity of a subsequent part.

12. The parts delivery apparatus as defined in claim 11, wherein the receiver unit comprises a circuit communicating with the first and second sensors that is operable to apply a high voltage in response to receiving the first signal, and that is further operable to stop applying the high voltage in response to receiving the second, subsequent signal.

13. The parts delivery apparatus as defined in claim 12, wherein the receiver unit further comprises a microprocessor having an Input/Output pin communicating with the circuit, the microprocessor serving to measure a length of time (T1) that the high voltage is applied to the Input/Output pin and to determine the velocity of the part based on the length of time (T1) and the distance (d).

14. The parts delivery apparatus as defined in claim 13, wherein the receiver unit further comprises a display unit and wherein the microprocessor is operable to display the velocity of the part on the display unit.

15. The parts delivery apparatus as defined in claim 13, wherein the receiver unit further comprises an LED indicator, the microprocessor activating the LED indicator in response to determining that the velocity of the part is within the predetermined range.

* * * * *

UNITED STATES PATENT AND TRADEMARK OFFICE
CERTIFICATE OF CORRECTION

PATENT NO. : 6,670,803 B2
DATED : December 30, 2003
INVENTOR(S) : Rankin

It is certified that error appears in the above-identified patent and that said Letters Patent is hereby corrected as shown below:

Column 8,
Line 22, after "of" (first occurrence), delete "determining a velocity of".

Column 9,
Line 15, after "device" (first occurrence), insert -- , -- (comma).

Signed and Sealed this

Thirtieth Day of March, 2004

JON W. DUDAS
*Acting Director of the United States Patent and Trademark Office*